United States Patent
Ohashi et al.

(10) Patent No.: US 11,438,868 B2
(45) Date of Patent: Sep. 6, 2022

(54) COMMUNICATION DEVICE AND POSITION ESTIMATION METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/228,834

(22) Filed: Apr. 13, 2021

(65) Prior Publication Data

US 2021/0368472 A1 Nov. 25, 2021

(30) Foreign Application Priority Data

May 21, 2020 (JP) .............................. JP2020-088728

(51) Int. Cl.
*H04W 64/00* (2009.01)
*H04W 28/02* (2009.01)
*H04W 40/20* (2009.01)

(52) U.S. Cl.
CPC ..... *H04W 64/006* (2013.01); *H04W 28/0226* (2013.01); *H04W 40/20* (2013.01)

(58) Field of Classification Search
CPC ............... H04W 64/00; H04W 64/006; H04W 28/0226; H04W 40/023; H04W 40/20; H04W 4/023; H04W 4/40; G01S 5/14; G01S 5/0284; G01S 5/0294; G01S 13/931; G01S 13/765
See application file for complete search history.

(56) References Cited

U.S. PATENT DOCUMENTS

| | | | | |
|---|---|---|---|---|
| 9,304,187 | B2* | 4/2016 | Jang | H04W 76/14 |
| 11,320,513 | B2* | 5/2022 | Kusumoto | H04W 64/006 |
| 2005/0035897 | A1* | 2/2005 | Perl | G01S 5/12 |
| | | | | 342/36 |
| 2015/0282116 | A1* | 10/2015 | Cho | G01S 5/0294 |
| | | | | 455/456.1 |
| 2020/0031315 | A1* | 1/2020 | Breer | G01S 5/14 |

FOREIGN PATENT DOCUMENTS

JP 2014-051809 3/2014

* cited by examiner

*Primary Examiner* — Siu M Lee
(74) *Attorney, Agent, or Firm* — Greenblum & Bernstein, P.L.C.

(57) ABSTRACT

A communication device comprising: a plurality of wireless communication units configured to perform wireless communication with another communication device; and a control unit configured to estimate positional information indicating a position at which the other communication device is located based on at least one distance measurement value indicating a distance between the other communication device and at least one wireless communication unit and obtained through the wireless communication of each of the plurality of wireless communication units, wherein the control unit corrects first positional information among a plurality of pieces of positional information estimated at different times based on second positional information different from the first positional information among the plurality of pieces of positional information.

11 Claims, 8 Drawing Sheets

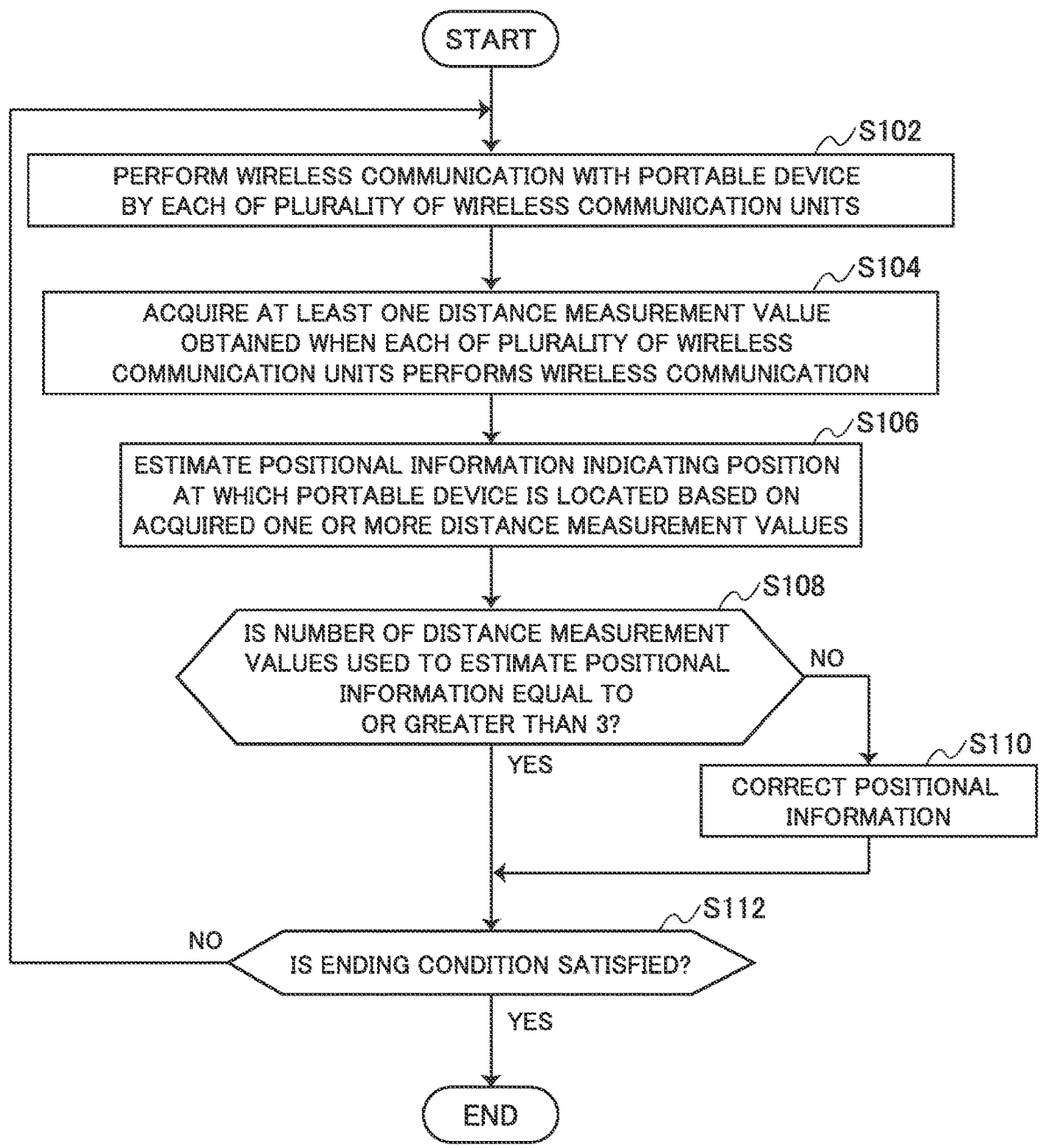

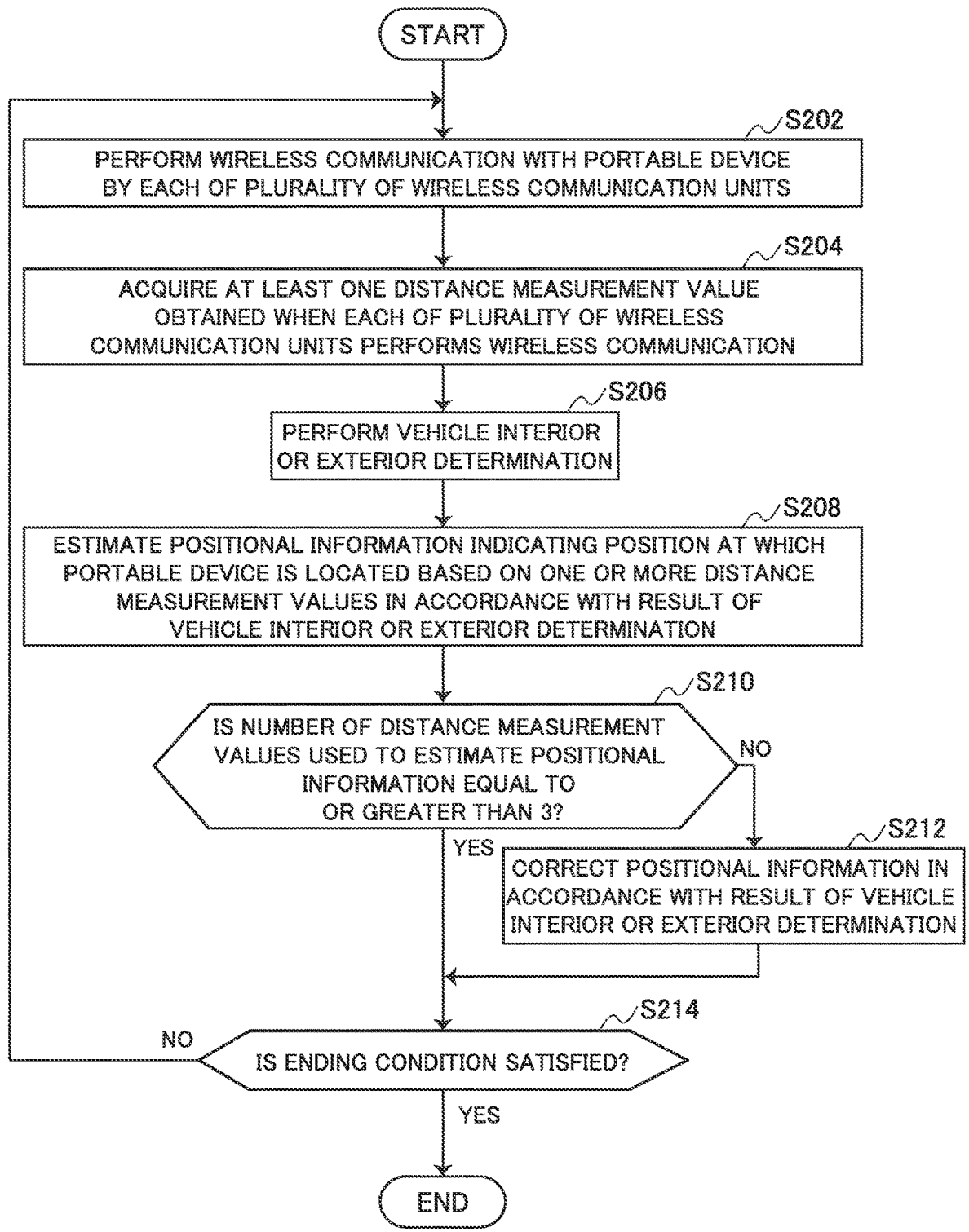

COMMUNICATION DEVICE AND POSITION ESTIMATION METHOD

CROSS REFERENCE TO RELATED APPLICATIONS

This application is based upon and claims benefit of priority from Japanese Patent Application No. 2020-088728, filed on May 21, 2020, the entire contents of which are incorporated herein by reference.

BACKGROUND

The present invention relates to a communication device and a position estimation method.

In recent years, ranging technologies for measuring distances to ranging targets have been used for various services. For example, JP 2014-51809A discloses a technology for measuring a distance between a vehicle and a portable device and determining whether a door is locked or unlocked in accordance with the measured distance or giving a warning that the door is opened.

SUMMARY

However, the technology disclosed in JP 2014-51809A merely provides a service simply in accordance with a distance and it is difficult to provide a service in accordance with a more detailed situation.

Accordingly, the present invention has been devised in view of the foregoing problem and an objective of the present invention is to provide a structure capable of estimating a position of a ranging target in more detail using a ranging technology.

To solve the foregoing problem, according to an aspect of the present invention, a communication device includes: a plurality of wireless communication units configured to perform wireless communication with another communication device; and a control unit configured to estimate positional information indicating a position at which the other communication device is located based on at least one distance measurement value indicating a distance between the other communication device and at least one wireless communication unit and obtained through the wireless communication of each of the plurality of wireless communication units. The control unit corrects first positional information among a plurality of pieces of positional information estimated at different times based on second positional information different from the first positional information among the plurality of pieces of positional information.

To solve the foregoing problem, according to another aspect of the present invention, a communication device includes: a wireless communication unit configured to perform wireless communication with each of a plurality of other wireless communication units included in another communication device; and a control unit configured to estimate positional information indicating a position at which the communication device is located based on at least one distance measurement value indicating a distance between the wireless communication unit and at least one other wireless communication unit and obtained through the wireless communication performed by the wireless communication unit. The control unit corrects first positional information among a plurality of pieces of positional information estimated at different times based on second positional information different from the first positional information among the plurality of pieces of positional information.

To solve the foregoing problem, according to still another aspect of the present invention, a positional estimation method is performed by a communication device including a plurality of wireless communication units performing wireless communication with another communication device. The method includes: estimating positional information indicating a position at which the other communication device is located based on at least one distance measurement value indicating a distance between the other communication device and at least one wireless communication unit and obtained through the wireless communication of each of the plurality of wireless communication units; and correcting first positional information among a plurality of pieces of positional information estimated at different times based on second positional information different from the first positional information among the plurality of pieces of positional information.

According to the present invention, as described above, it is possible to provide the structure with which a position of a ranging target is able to be estimated in more detail using the ranging technology.

BRIEF DESCRIPTION OF THE DRAWINGS

FIG. 7 is a sequence diagram illustrating an example of a flow of a process performed by a communication unit according to the embodiment.

FIG. 8 is a sequence diagram illustrating an example of a flow of a process performed by a communication unit according to a modification example.

DETAILED DESCRIPTION OF THE EMBODIMENTS

Figure 1:
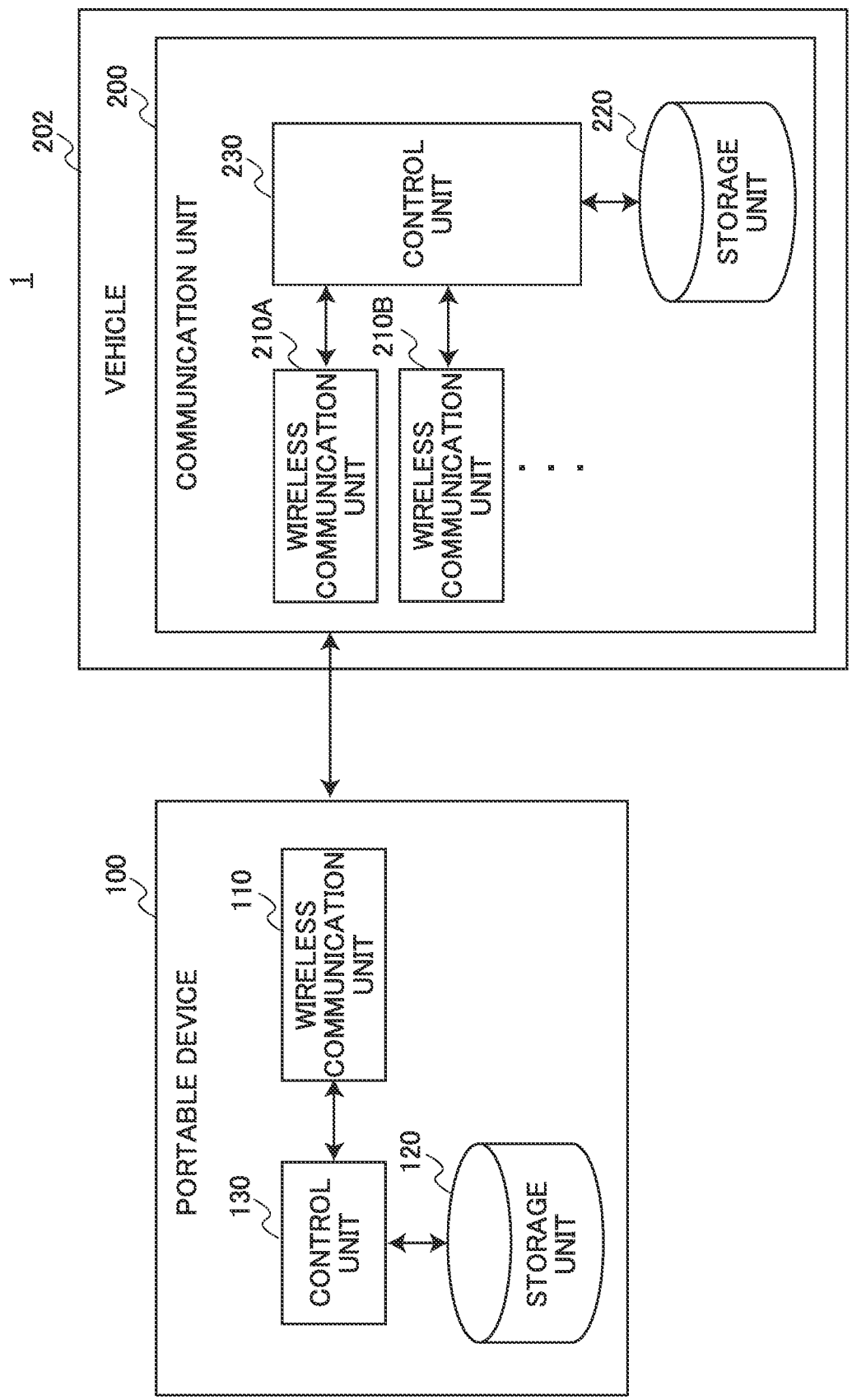
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

In the present specification and the drawings, different letters are suffixed to the same reference numerals to distinguish elements that have substantially the same configurations in some cases. For example, a plurality of elements that have substantially the same functional configurations are distinguished as in wireless communication units 210A, 210B, and 210C, as necessary. Here, when it is not necessary to distinguish a plurality of elements that have substantially the same functional configurations from each other, only the same reference numerals are given. For example, when it is not necessary to particularly distinguish the wireless communication units 210A, 210B, and 210C, the wireless communication units 210A, 210B, and 210C are simply referred to as the wireless communication units 210.

1. CONFIGURATION EXAMPLE

FIG. 1 is a diagram illustrating an example of a configuration of a system 1 according to an embodiment of the present invention. As illustrated in FIG. 1, the system 1 according to the embodiment includes a portable device 100 and a communication unit 200. The communication unit 200 according to the embodiment is mounted in a vehicle 202. The vehicle 202 is an example of a target used by a user.

The embodiment involves a communication device on the side of an authenticated person and a communication device one the side of an authenticating person. In the example illustrated in FIG. 1, the portable device 100 is an example of the communication device on the authenticated person side. The communication unit 200 is an example of the communication device on the authenticating person side.

In the system 1, when a user (for example, a driver of the vehicle 202) carrying the portable device 100 approaches the vehicle 202, wireless communication for authentication is performed between the portable device 100 and the communication unit 200 mounted in the vehicle 202. When the authentication succeeds, a door lock of the vehicle 202 is unlocked or an engine is started, and the vehicle 202 enters a state in which the vehicle 202 can be used by the user. This system is also referred to as a smart entry system. Hereinafter, each constituent element will be described in order.

(1) Portable Device 100 The portable device 100 is configured as any device carried by the user. Any device includes an electronic key, a smartphone, and a wearable terminal. As illustrated in FIG. 1, the portable device 100 includes a wireless communication unit 110, a storage unit 120, and a control unit 130.

Wireless Communication Unit 110

The wireless communication unit 110 has a function of performing wireless communication with the communication unit 200. In particular, the wireless communication unit 110 performs wireless communication with each of the plurality of wireless communication units 210 included in the communication unit 200. The wireless communication unit 110 receives a wireless signal from the communication unit 200. The wireless communication unit 110 transmits a wireless signal to the communication unit 200.

The wireless communication between the wireless communication unit 110 and the communication unit 200 is performed in conformity with any wireless communication standard.

As an example of the wireless communication standard, a signal can be transmitted and received using an ultra-wide band (UWB). When an impulse scheme is used for wireless communication of a signal using the UWB, an aerial propagation time of the radio waves can be measured with high accuracy by using radio waves with a very short pulse width equal to or less than nano-seconds, and thus ranging based on a propagation time can be performed with high accuracy. The ranging is to measure a distance. The UWB indicates a frequency bandwidth of about 3 GHz to about 10 GHz in many cases.

The wireless communication unit 110 is configured as, for example, a communication interface capable of performing communication in a UWB.

Storage Unit 120

The storage unit 120 has a function of storing various kinds of information for operating the portable device 100. For example, the storage unit 120 stores a program for operating the portable device 100, an identifier (ID) for authentication, a password, an authentication algorithm, and the like. The storage unit 120 is configured by, for example, a storage medium such as a flash memory and a processing device that performs recording and reproducing on the storage medium.

Control Unit 130

The control unit 130 has a function of performing a process in the portable device 100. For example, the control unit 130 controls the wireless communication unit 110 such that it performs wireless communication with the communication unit 200. The control unit 130 reads information from the storage unit 120 and writes information in the storage unit 120. The control unit 130 controls a process for authentication performed with the communication unit 200. As the process for authentication, a ranging process to be described below can be exemplified. The control unit 130 is configured by, for example, an electronic circuit such as a central processing unit (CPU) and a microprocessor.

(2) Communication Unit 200

The communication unit 200 is provided in association with the vehicle 202. Here, the communication unit 200 is assumed to be mounted in the vehicle 202. As an example, the communication unit 200 may be provided in the vehicle interior of the vehicle 202. As another example, the communication unit 200 may be embedded as a communication module in the vehicle 202. As illustrated in FIG. 1, the communication unit 200 includes a plurality of wireless communication units 210 (210A, 210B, and the like), a storage unit 220, and a control unit 230.

Wireless Communication Unit 210

The wireless communication unit 210 has a function of performing wireless communication with the portable device 100. The wireless communication unit 210 receives a wireless signal from the portable device 100. The wireless communication unit 210 transmits a wireless signal to the portable device 100.

The wireless communication between the wireless communication unit 210 and the portable device 100 is performed in conformity with any wireless communication standard. An example of the wireless communication standard includes a standard for transmitting and receiving signals using a UWB. The wireless communication unit 210 is configured as, for example, a communication interface capable of performing communication in a UWB.

Storage Unit 220

The storage unit 220 has a function of storing various kinds of information for operating the communication unit 200. For example, the storage unit 220 stores a program for operating the communication unit 200, an authentication algorithm, and the like. The storage unit 220 is configured by, for example, a storage medium such as a flash memory and a processing device that performs recording and reproducing on the storage medium.

Control Unit 230

The control unit 230 has a function of generally controlling operations of the communication unit 200 and in-vehicle devices mounted in the vehicle 202. For example, the control unit 230 controls the wireless communication unit 210 to perform communication with the portable device 100. The control unit 230 reads information from the storage unit 220 and writes information in the storage unit 220. The control unit 230 controls a process for authentication performed with the portable device 100. As the process for authentication, a ranging process and a position estimation process to be described below can be exemplified.

The control unit 230 also functions as a door lock control unit that controls a door lock of the vehicle 202 and performs locking and unlocking the door lock. The control unit 230 also functions as an engine control unit that controls an engine of the vehicle 202 and performs starting and stopping the engine. A power source equipped in the vehicle 202 may be a motor or the like other than the engine. The control unit 230 is configured as, for example, an electronic circuit such as an electronic control unit (ECU).

2. TECHNICAL FEATURES

(1) Ranging Process

The portable device 100 and the communication unit 200 perform a ranging process. The ranging process is a process of measuring a distance between the portable device 100 and the communication unit 200. A distance measured through the ranging process is also referred to as a distance measurement value below.

In the ranging process, a signal for the ranging process can be transmitted and received.

An example of the signal transmitted and received for the ranging process is a ranging signal. The ranging signals are signals transmitted and received to measure a distance between devices. The ranging signal is also a signal to be measured. For example, a time taken to transmit and receive the ranging signal is measured. In general, the ranging signal has a frame format that does not have a payload in which data is stored. Of course, the ranging signal may have a frame format that has a payload in which data is stored.

In the ranging process, a plurality of ranging signals can be transmitted and received between devices. Of the plurality of ranging signals, a ranging signal transmitted from one device to another device is also referred to as a first ranging signal. A ranging signal transmitted from a device that has received the first ranging signal to a device that has transmitted the first ranging signal is also referred to as a second ranging signal.

Another example of the signal transmitted and received for the ranging process is a data signal. The data signal is a signal that stores and transmits data. The data signal has a frame format that does not have a payload in which data is stored.

Transmitting and receiving a signal in the ranging process is also referred to as ranging communication below. In the embodiment, the wireless communication units 110 and 210 are assumed to perform the ranging communication. In the ranging process, as a distance between the portable device 100 and the communication unit 200, a distance between the wireless communication units 110 and 210 transmitting and receiving the ranging signal is measured.

An example of the ranging process will be described with reference to FIG. 2.

Figure 2:
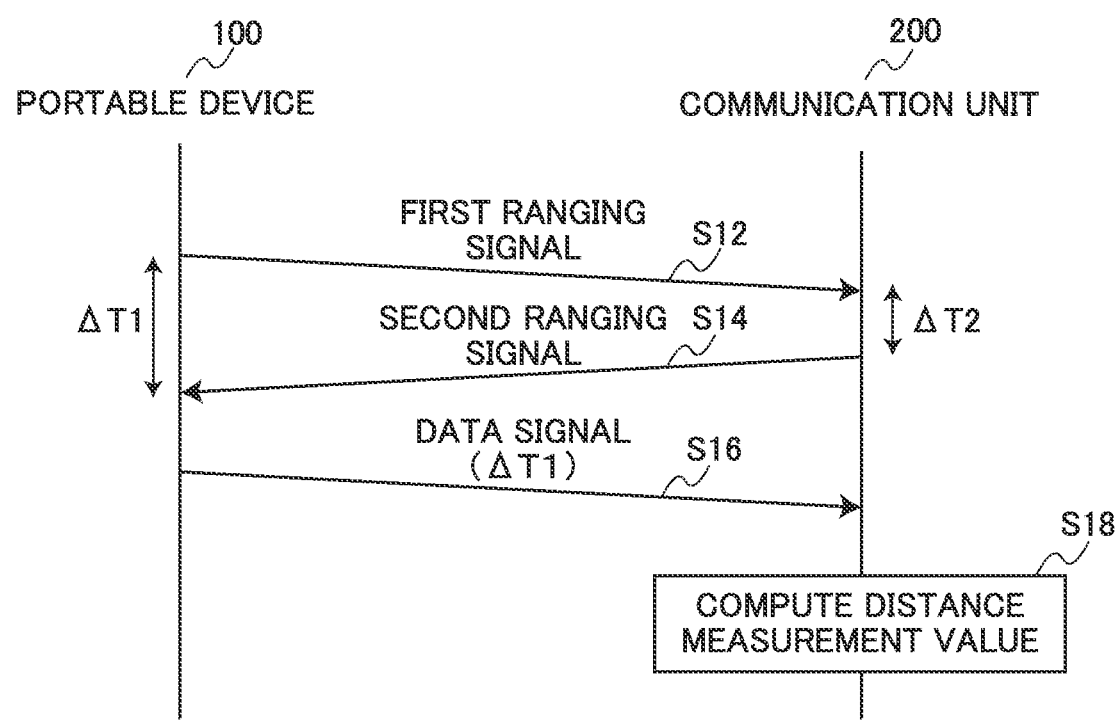
FIG. 2 is a sequence diagram illustrating an example of a flow of a ranging process performed by the system according to the embodiment.

FIG. 2 is a sequence diagram illustrating an example of a flow of the ranging process performed by the system 1 according to the embodiment. As illustrated in FIG. 2, the portable device 100 and the communication unit 200 are involved in the sequence.

As illustrated in FIG. 2, the wireless communication unit 110 of the portable device 100 first transmits the first ranging signal (step S12). For example, the first ranging signal may be transmitted as a signal for which the UWB is used.

Subsequently, when the first ranging signal is received from the portable device 100, the wireless communication unit 210 of the communication unit 200 transmits the second ranging signal as a response to the first ranging signal (step S14). For example, the second ranging signal may be transmitted as a signal for which the UWB is used.

At this time, the control unit 230 of the communication unit 200 measures a time $\Delta T2$ from a reception time of the first ranging signal to a transmission time of the second ranging signal in the communication unit 200. On the other hand, when the second ranging signal is received from the communication unit 200, the control unit 130 of the portable device 100 measures a time $\Delta T1$ from a transmission time of the first ranging signal to a reception time of the second ranging signal in the portable device 100.

Subsequently, the wireless communication unit 110 of the portable device 100 transmits a data signal including information indicating the time $\Delta T1$ (step S16). For example, the data signal may be transmitted as a signal for which the UWB is used.

Then, when the data signal is received, the control unit 230 of the communication unit 200 computes a distance measurement value indicating a distance between the portable device 100 and the communication unit 200 based on the measured time $\Delta T2$ and the time $\Delta T1$ indicated by the information included in the data signal (step S18). Specifically, the control unit 230 computes a propagation time of a one-way signal by dividing a result of $\Delta T1-\Delta T2$ by 2. The control unit 230 computes a distance measurement value indicating a distance between the portable device 100 and the communication unit 200 by multiplying the propagation time by a speed of the signal.

Here, in the ranging communication, it is preferable to transmit and receive the signal for which the UWB is used. At least, it is preferable to transmit and receive the ranging signal as the signal for which the UWB is used. In this configuration, as described above, it is possible to perform the ranging with high accuracy with regard to the UWB.

(2) Disposition of Wireless Communication Unit 210

Each of the plurality of wireless communication units 210 is disposed in the vehicle 202 to be fixed to a position relatively to the vehicle 202. For example, each of the plurality of wireless communication units 210 is disposed at a predetermined position of the vehicle 202. Here, when any three wireless communication units 210 are selected from the plurality of wireless communication units 210, the selected three wireless communication unit 210 are assumed to form a plane. That is, the three or more wireless communication units 210 are assumed not to be located on the same straight line. The three or more wireless communication units 210 may be located on the same straight line or all the wireless communication units 210 may be located on the same straight line.

Figure 3:
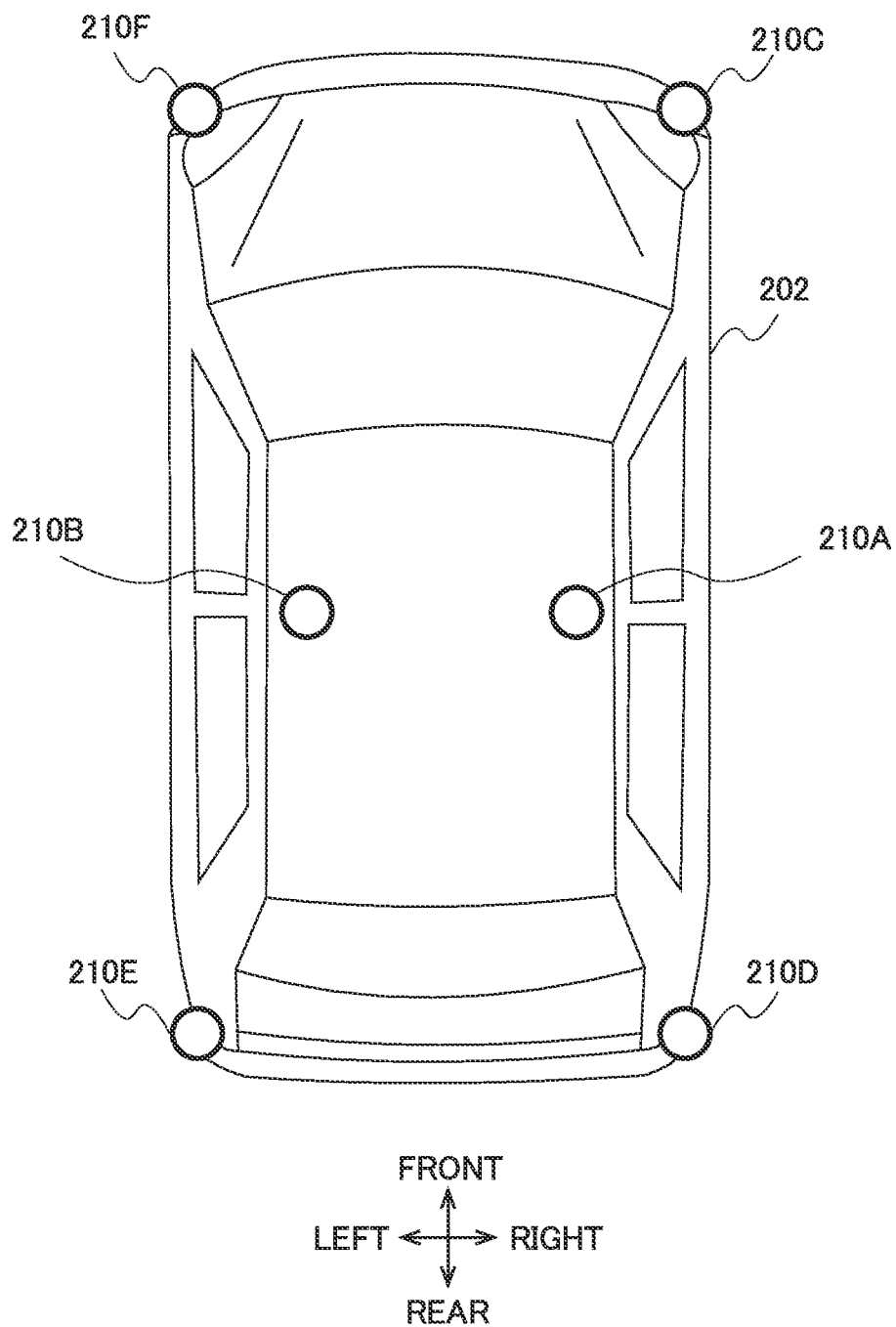
FIG. 3 is a diagram illustrating an example of disposition of a wireless communication unit according to the embodiment.

FIG. 3 is a diagram illustrating an example of disposition of the wireless communication unit 210 according to the embodiment. In the example illustrated in FIG. 3, the wireless communication unit 210A to 210F are disposed at different positions in the vehicle 202. As illustrated in FIG. 3, a traveling direction of the vehicle 202 is also referred to as a front direction. A direction opposite to the traveling direction of the vehicle 202 is also referred to as a rear direction. A direction perpendicular to the traveling direction of the vehicle 202 is also referred to as the right and left directions.

In the example illustrated in FIG. 3, the wireless communication units 210A and 210B are disposed at positions separated to the right and left near a center of the front and rear directions of the vehicle 202. Specifically, the wireless communication unit 210A is disposed in the right middle of the vehicle 202. The wireless communication unit 210B is disposed in the left middle of the vehicle 202. For example, the wireless communication units 210A and 210B may be disposed in the vehicle interior. The vehicle interior is a space of the vehicle 202 in which the user gets in the vehicle 202

In the example illustrated in FIG. 3, the wireless communication units 210C to 210F are disposed in the vehicle exterior of the vehicle 202. Specifically, the wireless communication unit 210C is disposed at the front end and the right end of the vehicle 202. The wireless communication unit 210D is disposed at the rear end and the right end of the vehicle 202. The wireless communication unit 210E is disposed at the rear end and the left end of the vehicle 202. The wireless communication unit 210F is disposed at the front end and the left end of the vehicle 202. For example, the wireless communication units 210C to 210F may be disposed in a bumper of the vehicle 202. The bumper is an absorbing device that softens vibration and shock when the vehicle 202 comes into contact with another object.

(3) Position Estimation Process

The control unit 230 performs a position estimation process. The position estimation process is a process of estimating positional information indicating a position at which the portable device 100 is located.

The positional information of the portable device 100 estimated through the position estimation process is used for authentication performed between the portable device 100 and the communication unit 200. For example, when the position of the portable device 100 indicated by the estimated positional information is included in a regular range, the authentication succeeds. When the position of the portable device 100 is not included in the regular range, the authentication fails.

Basic Process

The control unit 230 estimates the positional information indicating a position at which the portable device 100 is located based on at least one distance measurement value indicating a distance between the portable device 100 and at least one wireless communication unit 210 and obtained through wireless communication performed by each of the plurality of wireless communication unit 210. Here, the wireless communication is the above-described ranging communication. The control unit 230 acquires at least one distance measurement value indicating a distance between the portable device 100 and at least one wireless communication unit 210 which is at least some of the plurality of wireless communication units 210 performing the wireless communication by causing each of the plurality of wireless communication units 210 to perform the ranging communication. Then, based on at least the acquired one distance measurement value, the control unit 230 estimates the positional information indicating the position at which the portable device 100 is located.

The position at which the portable device 100 is located and which is indicated by the positional information estimated in the embodiment is a relative position of the portable device 100 with respect to the communication unit 200 is set as a reference. Specifically, the position at which the portable device 100 is located is expressed by coordinates of the portable device 100 on a first coordinate system. The first coordinate system is a coordinate system in which any position at which a position relative to the communication unit 200 (more specifically, each of the plurality of wireless communication units 210) is fixed is the origin. An example of the first coordinate system is a coordinate system in which the position of one of the plurality of wireless communication units 210 is the origin. Another example of the first coordinate system is a coordinate system in which any position of the vehicle 202 is the origin. An example of any position of the vehicle 202 is a central position of the vehicle 202.

The storage unit 220 stores the information indicating the position of each of the plurality of wireless communication units 210. The information indicating the position may be expressed by coordinates on the first coordinate system. The control unit 230 estimates the position at which the portable device 100 is located further based on the position of each of the plurality of wireless communication units 210.

Figure 4:
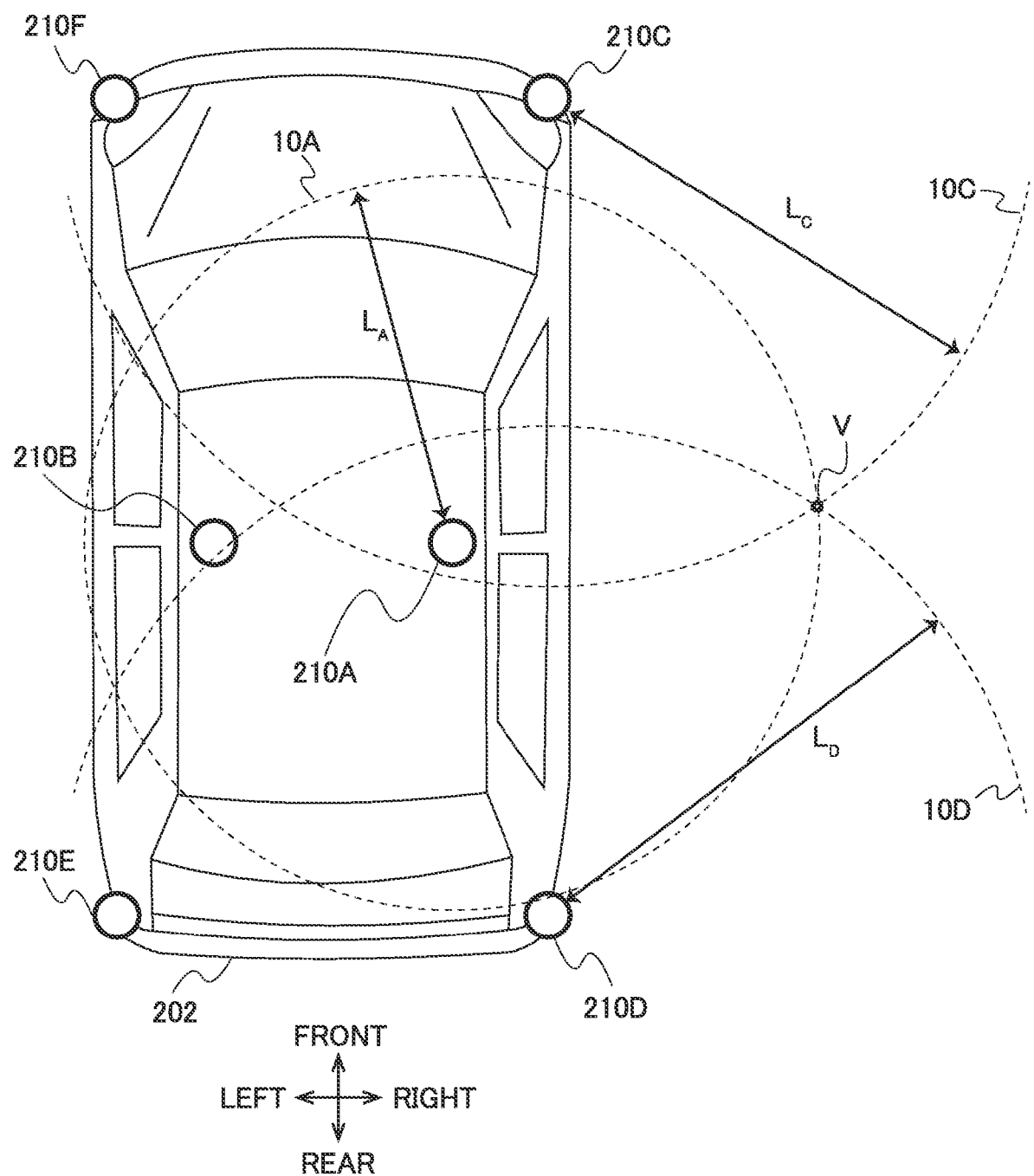
FIG. 4 is a diagram illustrating an example of a position estimation process according to the embodiment.

An example of the position estimation process will be described with reference to FIG. 4. FIG. 4 is a diagram illustrating an example of the position estimation process according to the embodiment. FIG. 4 illustrates an example in which positional information indicating a position at which the portable device 100 is located is estimated based on distance measurement values obtained through the wireless communication performed by the wireless communication units 210A, 210C, and 210D. A distance measurement value $L_A$ is a distance measurement value obtained through the wireless communication performed by the wireless communication unit 210A with the portable device 100 (specifically, the wireless communication unit 110). A distance measurement value $L_C$ is a distance measurement value obtained through the wireless communication performed by the wireless communication unit 210C with the portable device 100. A distance measurement value $L_D$ is a distance measurement value obtained through the wireless communication performed by the wireless communication unit 210D with the portable device 100.

The control unit 230 estimates coordinates satisfying conditions that a distance from the coordinates of the wireless communication unit 210A is the distance measurement value $L_A$, a distance from the coordinates of the wireless communication unit 210C is the distance measurement value $L_C$, and a distance from the coordinates of the wireless communication unit 210D is the distance measurement value $L_D$, in the first coordinate system, as the positional information indicating the position at which the portable device 100 is located. For example, the control unit 230 estimates the coordinates of a position V which is an intersection of a circle 10A in which a radius having a center at coordinates of the wireless communication unit 210A is the distance measurement value A, a circle 10C in which a radius having a center at coordinates of the wireless communication unit 210C is the distance measurement value $L_C$, and a circle 10D in which a radius having a center at coordinates of the wireless communication unit 210D is the distance measurement value $L_D$, as the positional information indicating the position at which the portable device 100 is located.

As described above, by using the three distance measurement values, it is possible to estimate the positional information indicating the position of the portable device 100 as one dot. Accordingly, according to the embodiment, it is possible to estimate the position of the portable device 100 in more detail than the simple distance measurement values.

Of course, in the position estimation process, three or more distance measurement values may be used. By estimating the positional information using a larger number of distance measurement values, it is possible to improve estimation accuracy of the positional information.

Correcting Positional Information

The control unit 230 repeatedly estimates the positional information along a time axis. Specifically, the control unit 230 repeatedly performs the ranging process along the time axis using each of the plurality of wireless communication units 210. Then, the control unit 230 estimates the positional information based on the distance measurement values obtained through the ranging process whenever the ranging process is performed using each of the plurality of wireless communication units 210.

At this time, the control unit 230 corrects first positional information among a plurality of pieces of positional information estimated at different times based on second positional information different from the first positional information among the plurality of pieces of positional information. In this configuration, an improvement in accuracy of the first positional information is expected.

Specifically, the control unit 230 corrects the first positional information using the positional information estimated based on the number of distance measurement values greater than the number of distance measurement values used to estimate the first positional information, as the second positional information. In this configuration, it is possible to improve estimation accuracy of the first positional information.

For example, the control unit 230 corrects the first positional information using the positional information estimated based on at least three distance measurement values as the second positional information. When the second positional information is estimated based on at least three distance measurement values, as described above with reference to FIG. 4, the second positional information indicates the position at which the portable device 100 is located as one dot. In this configuration, it is possible to correct the first positional information by the second positional information indicating the position at which the portable device 100 is located as one dot.

The first positional information indicates a plurality of positions. That is, the first positional information before the correction is information indicating a plurality of candidates for the position at which the portable device 100 is located. The control unit 230 performs selecting certain positions among the plurality of positions indicated by the first positional information as the position at which the portable device 100 is located as correcting the first positional information. In other words, the control unit 230 deletes information indicating a position unselected as the position at which the portable device 100 is located from the first positional information. In this configuration, the number of positions indicated by the first positional information after the correction can be reduced compared to the number of positions indicated by the first positional information after the correction. Accordingly, it is possible to improve the estimation accuracy of the first positional information. The number of positions indicated by the first positional information before the correction is preferably one. In this case, the position of the portable device 100 can be indicated as one dot by the first positional information after the correction.

The control unit 230 corrects the first positional information using the positional information estimated using the distance measurement values obtained through the wireless communication performed at a timing consecutive on a time axis with a timing at which the wireless communication in which the measured value used to estimate the first positional information is obtained is performed, as the second positional information. At the timing consecutive on the time axis, the position of the portable device 100 is assumed not to be abruptly changed. That is, the position to be indicated by the first positional information is assumed to be close to the position indicated by the second positional information estimated at the timing consecutive on the time axis with the first positional information. Accordingly, by correcting the first positional information based on the second positional information indicating the position close to the position to be indicated by the first positional information, it is possible to improve the estimation accuracy of the first positional information.

Specifically, the control unit 230 selects the position close to the position indicated by the second positional information among the plurality of positions indicated by the first positional information as the position at which the portable device 100 is located. In other words, the control unit 230 deletes information indicating a position away from the position indicated by the second positional information among the plurality of positions indicated by the first positional information from the first positional information. As described above, the position to be indicated by the first positional information is assumed to be close to the position indicated by the second positional information estimated at the timing consecutive on the time axis with the first positional information. In this configuration, from this point, it is possible to improve the estimation accuracy of the first positional information.

Further, the control unit 230 may correct the first positional information based on the plurality of pieces of second positional information. In this configuration, it is possible to further improve the estimation accuracy of the first positional information.

Specifically, the control unit 230 performs selecting a position consistent with a movement trajectory connecting positions at which the portable device 100 is located and which are indicated by the plurality of pieces of second positional information among the plurality of positions indicated by the first positional information, as a position at which the portable device 100 is located as correcting the first positional information. For example, the control unit 230 performs selecting a position at which a separation width from the movement trajectory of the portable device 100 indicated by the second positional information among the plurality of positions indicated by the first positional information is within a predetermined threshold as the position at which the portable device 100 is located as correcting the first positional information. In this configuration, it is possible to further improve the estimation accuracy of the first positional information.

An example of the correction process for the positional information will be described with reference to FIG. 5.

Figure 5:
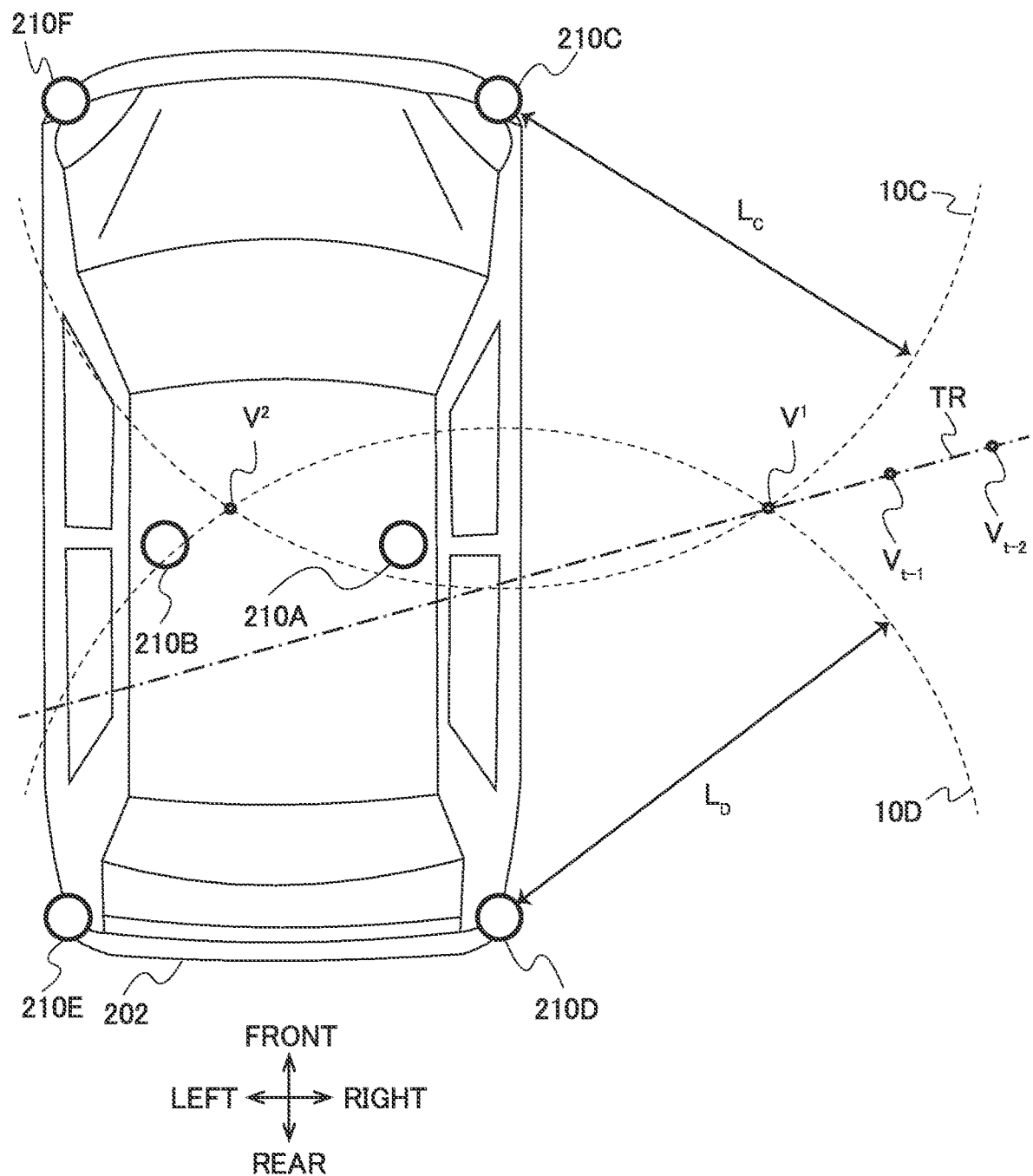
FIG. 5 is a diagram illustrating an example of a correction process for positional information according to the embodiment.

FIG. 5 is a diagram illustrating an example of the correction process for positional information according to the embodiment. At time t−2, the control unit 230 is assumed to estimate coordinates of a position $V_{t-2}$ as the positional information indicating the position at which the portable device 100 is located based on at least three distance measurement values. At time t−1, the control unit 230 is assumed to estimate coordinates of a position $V_{t-1}$ as the positional information indicating the position at which the portable device 100 is located based on at least three distance measurement values. Thereafter, at time t, the control unit 230 is assumed to estimate the positional information based on two distance measurement values $L_C$ and $L_D$. In this case, the control unit 230 estimates positions $V^1$ and $V^2$ which are intersections of the circle 10C in which a radius having a center at coordinates of the wireless communication unit 210C is the distance measurement value $L_C$ and the circle 10D in which a radius having a center at coordinates of the wireless communication unit 210D is the distance measurement value $L_D$, as the positional information of the portable device 100.

The positions $V^1$ and $V^2$ are examples of the plurality of positions indicated by the first positional information. The positions $V_{t-2}$ and $V_{t-1}$ are examples of the positions indicated by the second positional information. In particular, the position $V_{t-1}$ is an example of the position indicated by the positional information estimated using the distance measurement values obtained through the wireless communication performed at timing t−1 consecutive on the time axis with timing t at which the wireless communication in which the distance measurement value used to estimate the first positional information is obtained is performed.

The control unit 230 selects the position $V^1$ closer to the position $V_{t-1}$ between the positions $V^1$ and $V^2$ as the position at which the portable device 100 is located. From a different viewpoint, the control unit 230 selects the position $V^1$ consistent with a movement trajectory TR connecting positions $V_{t-2}$ and $V_{t-1}$ between the positions $V^1$ and $V^2$ as a position at which the portable device 100 is located. That is, the control unit 230 estimates that the portable device 100 is located at the position $V^1$ at time t. In this way, the control unit 230 can correct the positional information indicating the two positions $V^1$ and $V^2$ before the correction so that only the position $V^1$ is indicated.

The example in which the first positional information is estimated based on two distance measurement values has been described above, but the present invention is not limited thereto. The first positional information may be estimated based on one distance measurement value. An example of the correction process for the positional information in this case will be described with reference to FIG. 6.

Figure 6:
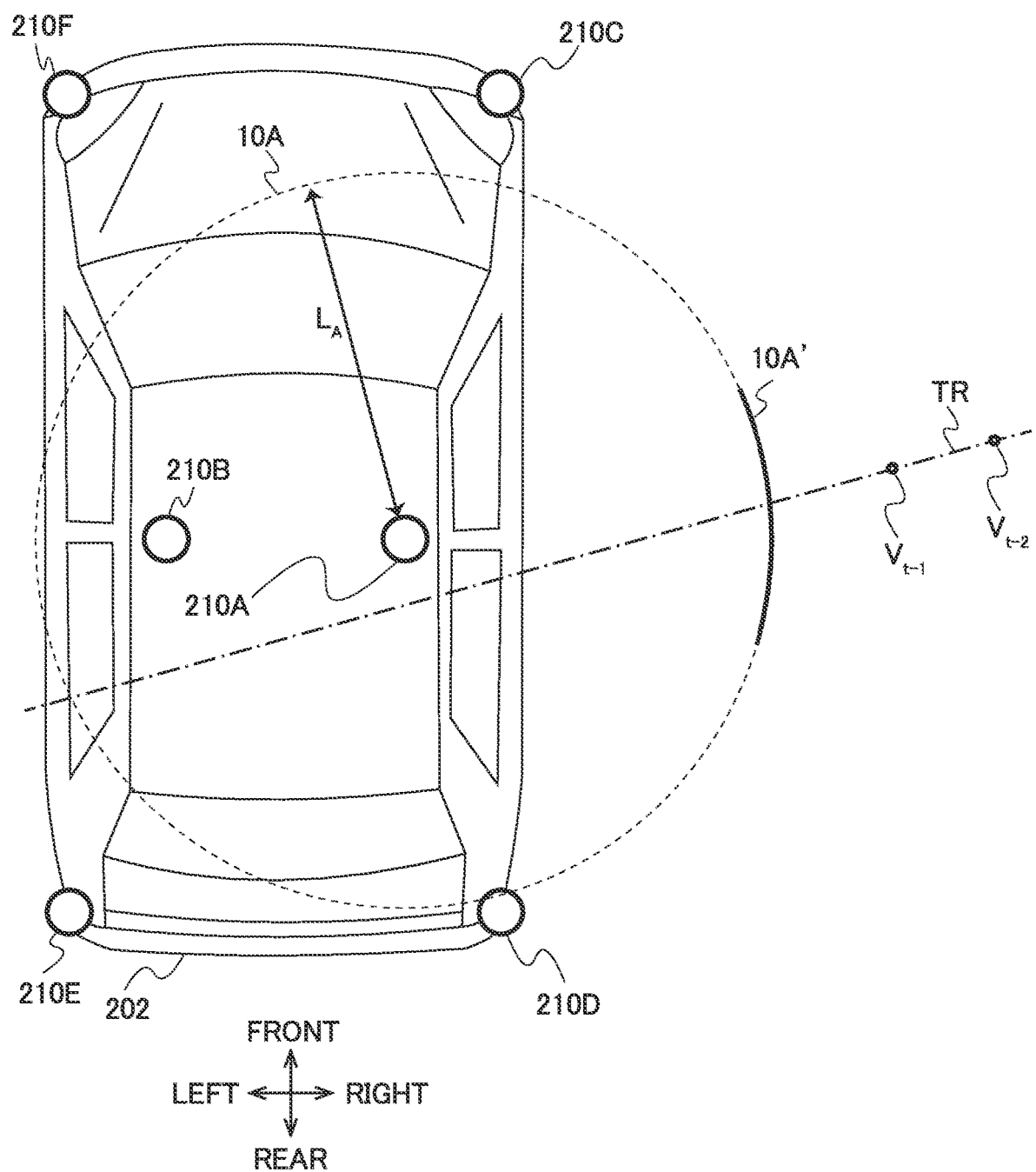
FIG. 6 is a diagram illustrating an example of the correction process for positional information according to the embodiment.

FIG. 6 is a diagram illustrating an example of the correction process for positional information according to the embodiment. At time t−2, the control unit 230 is assumed to estimate the coordinates of the position $V_{t-2}$ as the positional information indicating the position at which the portable device 100 is located based on at least three distance measurement values. At time t−1, the control unit 230 is assumed to estimate the coordinates of the position $V_{t-1}$ as the positional information indicating the position at which the portable device 100 is located based on at least three distance measurement values. Thereafter, at time t, the control unit 230 is assumed to acquire only one distance measurement value $L_A$ successfully. In this case, the control unit 230 estimates the circle 10A in which a radius having a center at the coordinates of the wireless communication unit 210A is the distance measurement value $L_A$ as the positional information of the portable device 100. That is, the control unit 230 estimates that the portable device 100 is located at a position on the circle 10A.

The circle 10A is an example of the plurality of positions indicated by the first positional information. The positions $V_{t-2}$ and $V_{t-1}$ are examples of the positions indicated by the second positional information. In particular, the position $V_{t-1}$ is an example of the position indicated by the positional information estimated using the distance measurement values through the wireless communication performed at timing t−1 consecutive on the time axis with timing t at which the wireless communication in which the distance measurement value used to estimate the first positional information is obtained is performed.

The control unit 230 selects an arc 10A' which is a portion closer to the position $V_{t-1}$ in the circle 10A as the position at which the portable device 100 is located. From a different viewpoint, the control unit 230 selects the arc 10A' which is a portion consistent with a movement trajectory TR connecting positions $V_{t-2}$ and $V_{t-1}$ in the circle 10A as a position at which the portable device 100 is located. That is, the control unit 230 estimates that the portable device 100 is located at a position on the arc 10A' at time t. In this way, the control unit 230 can correct the positional information indicating the circle 10A before the correction so that only the arc 10A' which is a narrower range is indicated.

(4) Flow of Process

FIG. 7 is a sequence diagram illustrating an example of a flow of a process performed by the communication unit 200 according to the embodiment.

As illustrated in FIG. 7, each of the plurality of wireless communication units 210 first performs the wireless communication with the portable device 100 (step S102). For example, each of the plurality of wireless communication units 210 performs the ranging communication with the portable device 100.

Subsequently, the control unit 230 acquires at least one distance measurement value indicating a distance between the portable device 100 and at least one wireless communication unit 210 and obtained when each of the plurality of wireless communication unit 210 performs the wireless communication (step S104). A method of acquiring the distance measurement value has been described above with reference to FIG. 2.

Subsequently, the control unit 230 estimates the positional information indicating the position at which the portable device 100 is located based on the acquired one or more distance measurement values (step S106). For example, the control unit 230 estimates the positional information indicating the position at which the portable device 100 is located as one dot based on at least three distance measurement values. Alternatively, the control unit 230 estimates the positional information indicating a plurality of positions at which the portable devices 100 is located based on two or less distance measurement values.

Subsequently, the control unit 230 determines whether the number of distance measurement values used to estimate the positional information is equal to or greater than 3 (step S108).

When it is determined that the number of distance measurement values used to estimate the positional information is equal to or greater than 3 (YES in step S108), the process proceeds to step S112.

Conversely, when it is determined that the number of distance measurement values used to estimate the positional information is equal to or less than 2 (NO in step S108), the control unit 230 corrects the positional information (step S110). For example, the control unit 230 corrects the positional information estimated based on two or less distance measurement values, based on another positional information estimated based on at least three distance measurement values. Thereafter, the process proceeds to step S112.

In step S112, the control unit 230 determines whether an ending condition is satisfied. An example of the ending condition is, for example, establishment of authentication based on the estimated positional information.

When it is determined that the ending condition is not satisfied (NO in step S112), the process returns to step S102 again. Conversely, when it is determined that the ending condition is satisfied (YES in step S112), the process ends.

(5) Modification Examples

The communication unit 200 may perform vehicle interior or exterior determination. The vehicle interior or exterior determination is a process of determining whether the portable device 100 is located in the vehicle interior or the vehicle exterior of the vehicle 202. As an example, the vehicle interior or exterior determination is performed by comparing information obtained through the wireless communication performed by the wireless communication unit 210 disposed in the vehicle interior with information obtained through the wireless communication performed by the wireless communication unit 210 disposed in the vehicle exterior. An example of the information obtained through the wireless communication is a radio field intensity of a signal received from the portable device 100. Another example of the information obtained through the wireless communication is a distance measurement value.

The communication unit 200 may estimate the positional information in accordance with a result of the vehicle interior or exterior determination. For example, when it is determined that the portable device 100 is located in the vehicle interior, the communication unit 200 may estimate the positional information based on the distance measurement values obtained by the wireless communication unit 210 disposed in the vehicle interior. When it is determined that the portable device 100 is located in the vehicle exterior, the communication unit 200 may estimate the positional information based on the distance measurement values obtained by the wireless communication unit 210 disposed in the vehicle exterior.

Similarly, the communication unit 200 may correct the positional information in accordance with a result of the vehicle interior or exterior determination. For example, when it is determined that the portable device 100 is located in the vehicle interior, the communication unit 200 may correct the positional information based on the distance measurement value obtained by the wireless communication unit 210 disposed in the vehicle interior. When it is determined that the portable device 100 is located in the vehicle exterior, the communication unit 200 may correct the positional information based on the distance measurement values obtained by the wireless communication unit 210 disposed in the vehicle exterior.

Hereinafter, an example of a flow of a process according to a modification example will be described with reference to FIG. 8. FIG. 8 is a sequence diagram illustrating an example of a flow of a process performed by the communication unit 200 according to a modification example.

As illustrated in FIG. 8, each of the plurality of wireless communication units 210 first performs the wireless communication with the portable device 100 (step S202). For example, each of the plurality of wireless communication units 210 performs the ranging communication with the portable device 100.

Subsequently, the control unit 230 acquires at least one distance measurement value indicating a distance between at least one wireless communication unit 210 and the device 100 and obtained when each of the plurality of wireless communication unit 210 performs the wireless communication (step S204). A method of acquiring the distance measurement value has been described above with reference to FIG. 2.

Subsequently, the control unit 230 performs the vehicle interior or exterior determination (step S206). For example, the control unit 230 determines whether the portable device 100 is located in the vehicle interior or the vehicle exterior based on the acquired one or more distance measurement value.

Subsequently, the control unit 230 estimates the positional information indicating the position at which the portable device 100 is located based on one or more distance measurement values in accordance with a result of the vehicle interior or exterior determination (step S208). As an example, when it is determined that the portable device 100 is located in the vehicle interior, the control unit 230 estimates the positional information indicating the position of the portable device 100 based on the distance measurement value obtained by the wireless communication unit 210 disposed in the vehicle interior. As another example, when it is determined that the portable device 100 is located in the vehicle exterior, the control unit 230 estimates the positional information indicating the position of the portable device 100 based on the distance measurement value obtained by the wireless communication unit 210 disposed in the vehicle exterior.

Subsequently, the control unit 230 determines whether the number of distance measurement values used to estimate the positional information is equal to or greater than 3 (step S210).

When it is determined that the number of distance measurement values used to estimate the positional information is equal to or greater than 3 (YES in step S210), the process proceeds to step S214.

Conversely, when it is determined that the number of distance measurement values used to estimate the positional information is equal to or less than 2 (NO in step S210), the control unit 230 corrects the positional information in accordance with a result of the vehicle interior or exterior determination (step S212). For example, when it is determined that the portable device 100 is located in the vehicle interior, the control unit 230 corrects the positional information based on another positional information estimated based on at least three distance measurement values obtained by the wireless communication unit 210 disposed in the vehicle interior. As another example, when it is determined that the portable device 100 is located in the vehicle exterior, the control unit 230 corrects the positional information based on the other positional information estimated which is based on at least three distance measurement values obtained by the wireless communication unit 210 disposed in the vehicle exterior. Thereafter, the process proceeds to step S214.

In step S214, the control unit 230 determines whether an ending condition is satisfied. An example of the ending condition is, for example, establishment of authentication based on the estimated positional information.

When it is determined that the ending condition is not satisfied (NO in step S214), the process returns to step S202 again. Conversely, when it is determined that the ending condition is satisfied (YES in step S214), the process ends.

3. CONCLUSION

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the foregoing embodiment, as described above, the information indicating the time ΔT1 from the transmission time of the first ranging signal to the reception time of the second ranging signal in the portable device 100 is included in the data signal, but the present invention is not limited to this example. The data signal includes information regarding the transmission time of the first ranging signal and the reception time of the second ranging signal. Hereinafter, another example of the information included in the data signal will be described.

Another example of the information included in the data signal is information indicating the transmission time of the first ranging signal and the reception time of the second ranging signal in the portable device 100. That is, the portable device 100 may transmit time stamps of a start point and an end point of ΔT1 without computing ΔT1.

Another example of the information included in the data signal is information indicating a distance between the portable device 100 and the wireless communication unit 210 computed based on a time from the transmission time of the first ranging signal and a reception time of the second ranging signal. That is, the portable device 100 may compute a distance between the portable device 100 and the wireless communication unit 210 and transmit information indicating the computed distance to the wireless communication unit 210. For example, when ΔT2 is a fixed value, the portable device 100 can compute a distance measurement value by measuring ΔT1.

For example, in the foregoing embodiment, the example in which the portable device 100 transmits the first ranging signal has been described, but the present invention is not limited to this example. For example, the wireless communication unit 210 may transmit the first ranging signal. In this case, when the first ranging signal is received, the portable device 100 transmits the second ranging signal as a response to the first ranging signal. Then, the portable device 100 transmits a data signal including information indicating a time ΔT2 from the reception time of the first ranging signal to the reception time of the second ranging signal. On the other hand, the wireless communication unit 210 computes a distance measurement value based on the time ΔT1 from the transmission time of the first ranging signal and the reception time of the second ranging signal and the time ΔT2 included in the data signal.

For example, in the foregoing embodiment, the example in which the distance measurement value is computed based on the propagation time has been described, but the present invention is not limited to this example. For example, the distance measurement value may be computed based on a radio field intensity.

For example, in the foregoing embodiment, the example in which the UWB is used as a wireless communication standard has been described, but the present invention is not limited to this example. As an example, a wireless communication standard in which a signal of a UHF band and a signal of an LF band are used may be used. As another example, any of wireless communication standards in which Bluetooth (registered trademark), Wi-Fi (registered trademark), Near Field Communication (NFC), and infrared light are used may be used.

For example, in the foregoing embodiment, the example in which the communication unit 200 estimates the positional information of the portable device 100 in which the communication unit 200 is a reference has been described, but the present invention is not limited to this example. For example, the portable device 100 may estimate the positional information of the portable device 100 in which the communication unit 200 is a reference. In this case, the control unit 130 estimates the positional information indicating the position at which the portable device 100 is located based on at least one distance measurement value indicating a distance between the wireless communication unit 110 and at least one wireless communication unit 210 obtained through the wireless communication performed by the wireless communication unit 110. The portable device 100 may receive the distance measurement value computed by the communication unit 200 or the portable device 100 may compute the range value. The control unit 130 corrects the first positional information among a plurality of pieces of positional information estimated at different times based on second positional information different from the first positional information among the plurality of pieces of positional information. In this configuration, the portable device 100 can estimate the positional information of the portable device 100 in which the communication unit 200 is a reference. Similarly, another device other than the portable device 100 and the communication unit 200 may estimate the positional information of the portable device 100 in which the communication unit 200 is a reference.

For example, in the foregoing embodiment, the example in which the communication unit 200 is a communication device mounted in a vehicle has been described, but the present invention is not limited to this example. The communication unit 200 may be mounted on any moving object such as an airplane or a ship other than a vehicle. Herein, the moving object is a device which moves.

For example, in the foregoing embodiment, the example in which the present invention is applied to a smart entry system has been described, but the present invention is not limited to this example. The present invention can be applied to any system that performs wireless communication. For example, the present invention can be applied to any pair of two devices such as a portable device, a vehicle, a smartphone, a drone, a house, and a household electric appliance. The pair of devices may include the same kind of two devices or may include different kinds of two devices.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication unit 120 storage unit
130 control unit
200 communication unit
210 wireless communication unit
220 storage unit
230 control unit

What is claimed is:

1. A communication device comprising:
a plurality of wireless communication units configured to perform wireless communication with an other communication device; and
a control unit configured to estimate positional information indicating a position at which the other communication device is located based on at least one distance measurement value indicating a distance between the other communication device and at least one wireless communication unit and obtained through the wireless communication of each of the plurality of wireless communication units,
wherein the control unit corrects first positional information among a plurality of pieces of positional information estimated at different times based on second positional information different from the first positional information among the plurality of pieces of positional information.

2. The communication device according to claim 1, wherein the control unit corrects the first positional information using the positional information estimated based on a number of distance measurement values more than a number of the distance measurement values used to estimate the first positional information, as the second positional information.

3. The communication device according to claim 2, wherein the control unit corrects the first positional information using a positional information estimated based on at least three distance measurement values as the second positional information.

4. The communication device according to claim 1,
wherein the first positional information indicates a plurality of positions, and
wherein the control unit performs selecting certain positions among the plurality of positions indicated by the first positional information as the position at which the other communication device is located as correcting the first positional information.

5. The communication device according to claim 1, wherein the control unit corrects the first positional information using the positional information estimated using the distance measurement value obtained through the wireless communication at a timing consecutive on a time axis with a timing at which the wireless communication in which the measured value used to estimate the first positional information is obtained is performed, as the second positional information.

6. The communication device according to claim 5, wherein the control unit selects a position close to a position indicated by the second positional information among a plurality of positions indicated by the first positional information as the position at which the other communication device is located.

7. The communication device according to claim 4, wherein the control unit corrects the first positional information based on a plurality of the pieces of second positional information.

8. The communication device according to claim 7, wherein the control unit performs selecting a position consistent with a movement trajectory connecting positions at which the other communication device is located and which are indicated by the plurality of pieces of second positional information among the plurality of positions indicated by the first positional information, as a position at which the other communication device is located as correcting the first positional information.

9. The communication device according to claim 1,
wherein the communication device is mounted in a vehicle, and
wherein the other communication device is carried by a user of the vehicle.

10. A communication device comprising:
a wireless communication unit configured to perform wireless communication with each of a plurality of other wireless communication units included in another communication device; and
a control unit configured to estimate positional information indicating a position at which the communication device is located based on at least one distance measurement value indicating a distance between the wireless communication unit and at least one other wireless communication unit and obtained through the wireless communication performed by the wireless communication unit,
wherein the control unit corrects first positional information among a plurality of pieces of positional information estimated at different times based on second positional information different from the first positional information among the plurality of pieces of positional information.

11. A positional estimation method performed by a communication device including a plurality of wireless communication units performing wireless communication with an other communication device, the method comprising:
estimating positional information indicating a position at which the other communication device is located based on at least one distance measurement value indicating a distance between the other communication device and at least one wireless communication unit and obtained through the wireless communication of each of the plurality of wireless communication units; and
correcting first positional information among a plurality of pieces of positional information estimated at different times based on second positional information different from the first positional information among the plurality of pieces of positional information.

* * * * *